United States Patent
Nagatsuka et al.

(10) Patent No.: US 12,121,082 B2
(45) Date of Patent: Oct. 22, 2024

(54) HUMANOID ROBOT

(71) Applicant: THK CO., LTD., Tokyo (JP)

(72) Inventors: Masaki Nagatsuka, Tokyo (JP); Yoshiyuki Yamanoue, Tokyo (JP); Ryuta Sakai, Osaka (JP); Katsuya Tsujinaka, Osaka (JP); Kana Kozawa, Osaka (JP)

(73) Assignee: THK CO., LTD., Tokyo (JP)

( * ) Notice: Subject to any disclaimer, the term of this patent is extended or adjusted under 35 U.S.C. 154(b) by 829 days.

(21) Appl. No.: 17/282,045

(22) PCT Filed: Oct. 15, 2019

(86) PCT No.: PCT/JP2019/040381
§ 371 (c)(1),
(2) Date: Apr. 1, 2021

(87) PCT Pub. No.: WO2020/080330
PCT Pub. Date: Apr. 23, 2020

(65) Prior Publication Data
US 2021/0360989 A1   Nov. 25, 2021

(30) Foreign Application Priority Data

Oct. 16, 2018  (JP) ................................. 2018-195397
Oct. 4, 2019  (JP) ................................. 2019-184137

(51) Int. Cl.
*A41D 13/002*    (2006.01)
*B25J 19/00*    (2006.01)

(52) U.S. Cl.
CPC ...... *A41D 13/0025* (2013.01); *B25J 19/0075* (2013.01)

(58) Field of Classification Search
CPC .... B25J 19/0075; B25J 19/00; B25J 19/0054; A41D 13/0025
See application file for complete search history.

(56) References Cited

U.S. PATENT DOCUMENTS

| | | | |
|---|---|---|---|
| 5,712,552 A | 1/1998 | Hirai et al. | |
| 2006/0128261 A1* | 6/2006 | Kawabe | B25J 19/0054 446/268 |

FOREIGN PATENT DOCUMENTS

| | | |
|---|---|---|
| CN | 1675109 A | 9/2005 |
| CN | 106196300 A | 12/2016 |
| CN | 106426285 A | 2/2017 |
| CN | 106715056 A | 5/2017 |

(Continued)

OTHER PUBLICATIONS

Office Action dated May 7, 2023, issued in counterpart CN Application No. 201980060255.8, with partial Search Report English translation. (9 pages).

(Continued)

*Primary Examiner* — Khoa D Huynh
*Assistant Examiner* — Erick I Lopez
(74) *Attorney, Agent, or Firm* — WHDA, LLP

(57) ABSTRACT

A humanoid robot (1) includes a heat discharge garment (5) that covers the humanoid robot (1), and an air blower provided in the humanoid robot (1) or the heat discharge garment (5) to blow external air into the humanoid robot (1) or the heat discharge garment (5). An air blowing flow path (101) is provided between the heat discharge garment (5) and an outer shell of the humanoid robot (1).

10 Claims, 11 Drawing Sheets

(56) References Cited

FOREIGN PATENT DOCUMENTS

| CN | 107144673 | A | | 9/2017 | |
|---|---|---|---|---|---|
| CN | 108451073 | A | | 8/2018 | |
| DE | 102011014383 | A1 | | 9/2012 | |
| EP | 1 136 196 | A1 | | 9/2001 | |
| JP | 9-254076 | A | | 9/1997 | |
| JP | 2001-239492 | A | | 9/2001 | |
| JP | 2004183157 | A | * | 7/2004 | ........ B25J 19/0075 |
| JP | 2006-132040 | A | | 5/2006 | |
| JP | 2010-125546 | A | | 6/2010 | |
| JP | 2015-74852 | A | | 4/2015 | |
| JP | 2016-151085 | A | | 8/2016 | |
| JP | 6319714 | B2 | | 5/2018 | |
| JP | 2018-131713 | A | | 8/2018 | |
| JP | 2018-141256 | A | | 9/2018 | |
| WO | 03/101858 | A2 | | 12/2003 | |
| WO | 2016/061449 | A1 | | 4/2016 | |

OTHER PUBLICATIONS

International Search Report dated Jan. 7, 2020, issued in counterpart International Application No. PCT/JP2019/040381, w/English translation (4 pages).
Office Action dated Jan. 4, 2024, issued in counterpart CN application No. 201980060255.8, with English translation. (8 pages).
Xu et al., "Progress in research on test and evaluation of protective clothing performance in disaster environment", China Safety Science Journal, May 15, 2017, vol. 27, No. 5, pp. 140-145, cited in CN Office Action dated Jan. 4, 2024. (6 pages).
The Extended European Search Report dated Jun. 13, 2022, issued in counterpart EP Application No. 19872830.5. (8 pages).

* cited by examiner

HUMANOID ROBOT

TECHNICAL FIELD

The present invention relates to a humanoid robot.

Priority is claimed on Japanese Patent Application No. 2018-195397, filed on Oct. 16, 2018 and Japanese Patent Application No. 2019-184137, filed on Oct. 4, 2019, the contents of which are incorporated herein by reference.

BACKGROUND ART

Patent Document 1 discloses a protective garment for a humanoid robot which covers a whole body of a humanoid robot to prevent dust and external water from entering the humanoid robot. The protective garment for the humanoid robot uses a fabric having high heat dissipation (material having a multi-layer structure of nylon fiber and nylon fiber and polyurethane foam resin) in order to externally dissipate heat of the humanoid robot. In addition, in the protective garment for the humanoid robot, a cooling air supply and discharge port that fetches air into the protective garment and discharges heated air is provided around a control device which generates the heat.

CITATION LIST

Patent Document

[Patent Document 1]
Japanese Unexamined Patent Application, First Publication No. 2004-183157

SUMMARY OF INVENTION

Technical Problem

Incidentally, the humanoid robot has multiple joints, and heat-generating portions are scattered in a whole body of the humanoid robot. Therefore, in order to cool the heat-generating portions of the whole body by using the air, it is necessary to blow the air to every place in the whole body of the humanoid robot. However, depending on a posture of the humanoid robot, an air blowing flow path may be narrowed, and an air flow may be blocked in some portions. In this case, the heat-generating portions of the whole body cannot be sufficiently cooled.

The present invention provides a humanoid robot capable of effectively cooling a whole body.

Solution to Problem

According to an aspect of the present invention, there is provided a humanoid robot including a heat discharge garment that covers the humanoid robot, and an air blower provided in the humanoid robot or the heat discharge garment to blow external air into the humanoid robot or the heat discharge garment. An air blowing flow path is provided between the heat discharge garment and an outer shell of the humanoid robot.

Advantageous Effects of Invention

According to the humanoid robot described above, the whole body of the humanoid robot can be effectively cooled.

DESCRIPTION OF EMBODIMENTS

Hereinafter, embodiments of the present invention will be described with reference to the drawings.

First Embodiment

Figure 1:
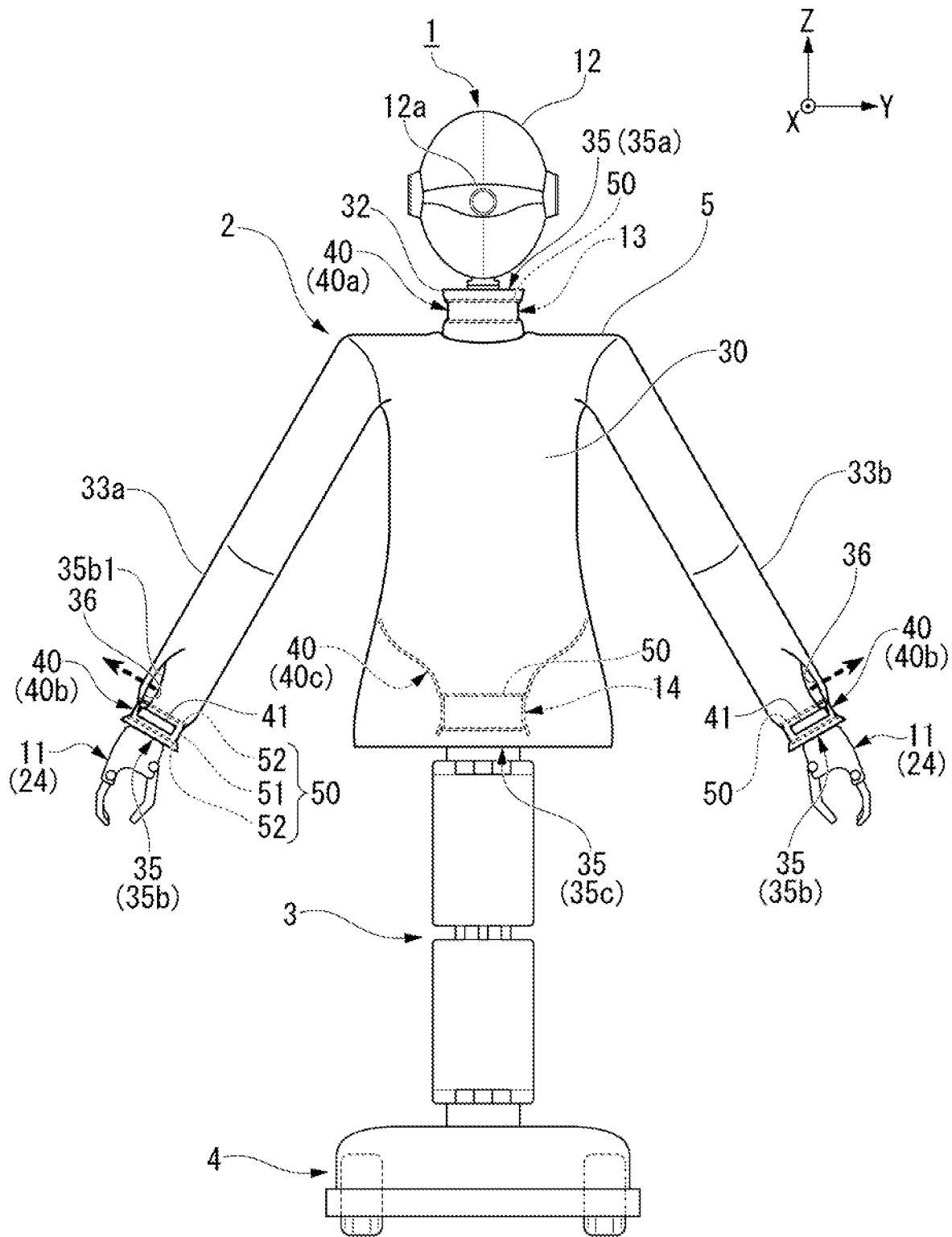
FIG. 1 is a front view of a humanoid robot wearing a heat discharge garment according to a first embodiment of the present invention.
Figure 2:
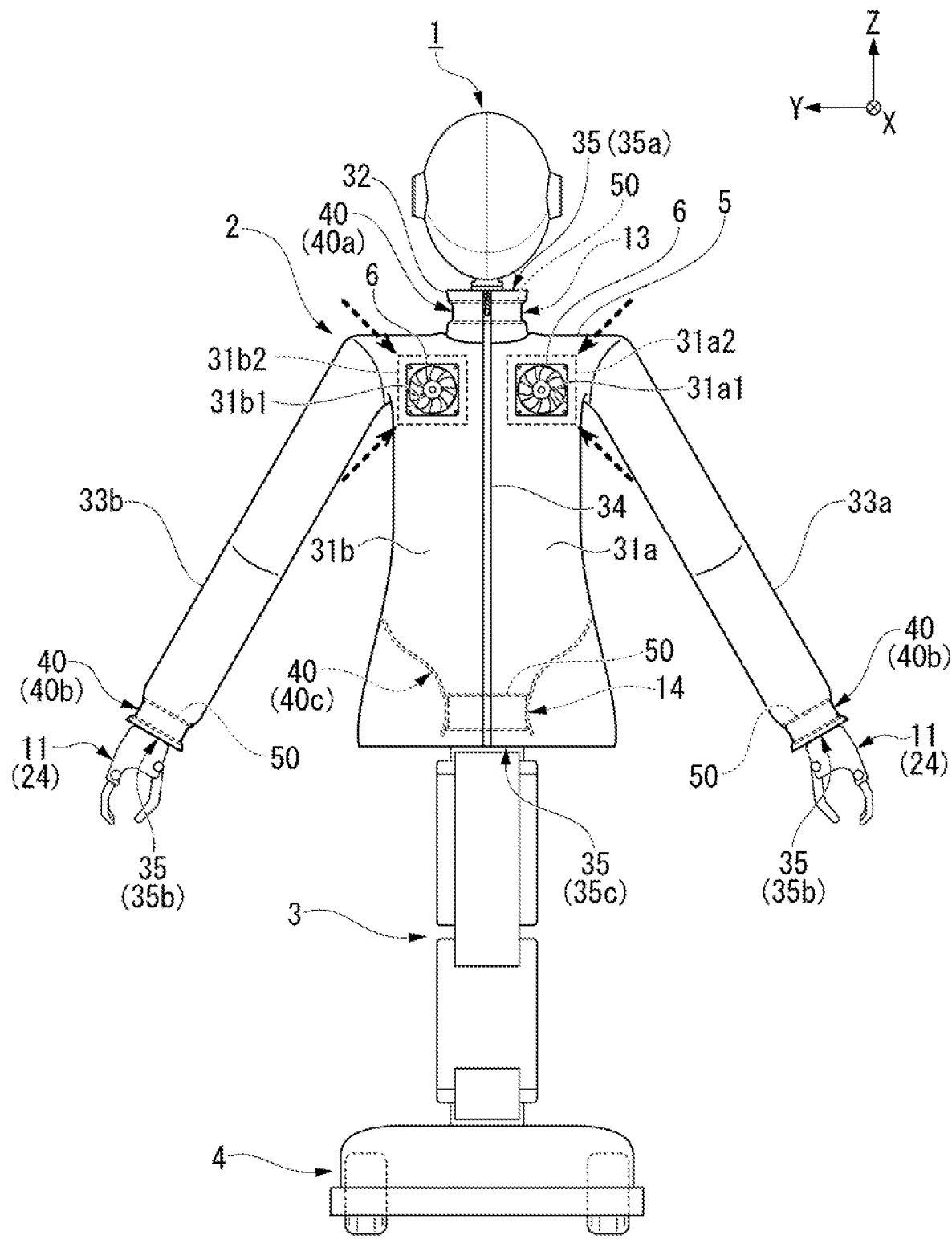
FIG. 2 is a rear view of the humanoid robot shown in FIG. 1.
Figure 3:
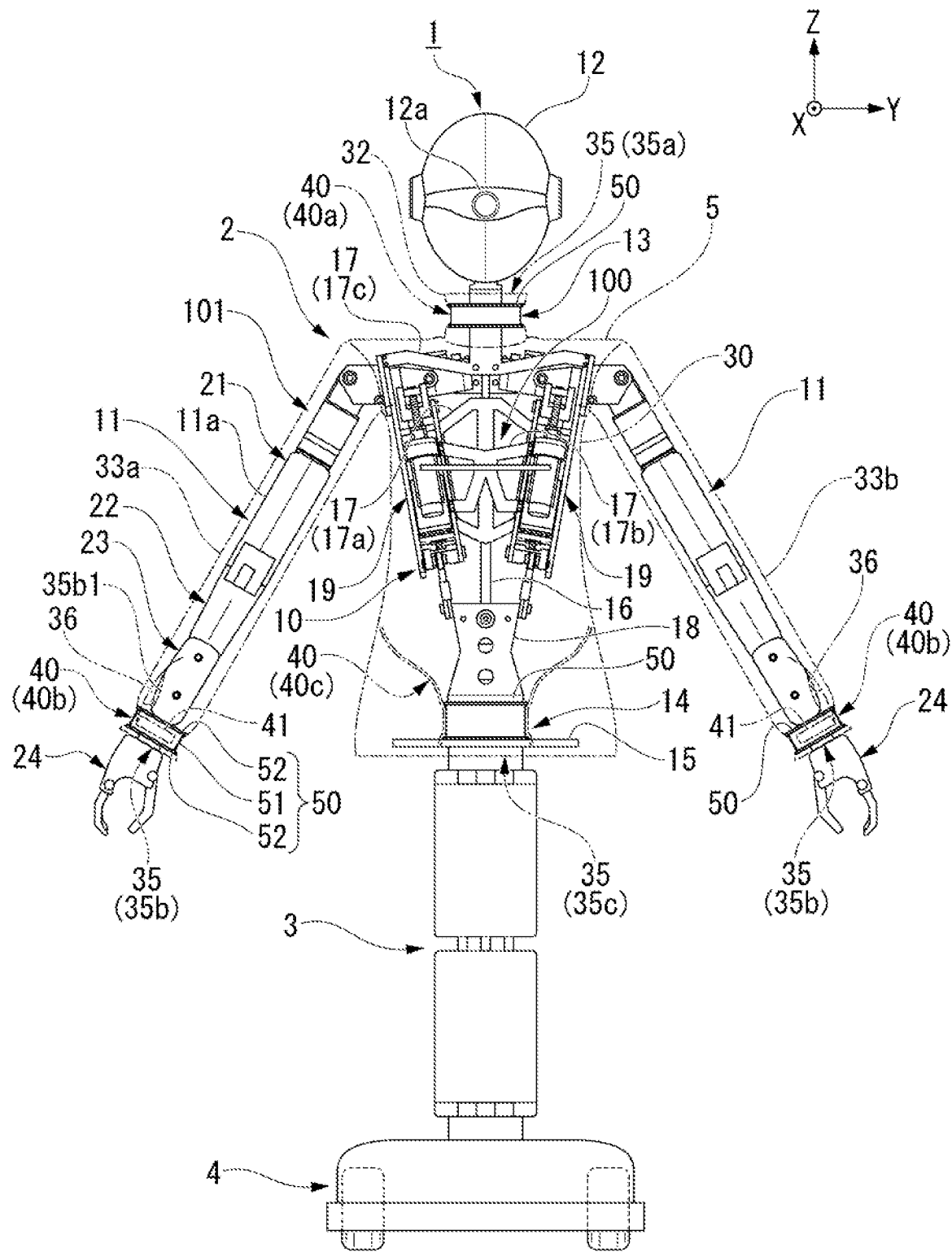
FIG. 3 is a front view showing an inner configuration of the heat discharge garment of the humanoid robot shown in FIG. 1.

FIG. 1 is a front view of a humanoid robot 1 wearing a heat discharge garment 5 according to a first embodiment of the present invention. FIG. 2 is a rear view of the humanoid robot 1 shown in FIG. 1. FIG. 3 is a front view showing an inner configuration of the heat discharge garment 5 of the humanoid robot 1 shown in FIG. 1.

As shown in the drawings, the humanoid robot 1 of the present embodiment includes a robot body 2, a lifter 3, and a mobile carriage 4.

The robot body 2 is a portion corresponding to an upper body of a person. The robot body 2 is configured to realize an operation close to that of the upper body of the person. The robot body 2 is covered with the heat discharge garment 5, and includes an air blower 6 on a rear surface. The lifter 3 is a portion corresponding to a leg portion of a lower body of the person. The lifter 3 can be bent and stretched upward and downward, and is connected to a lower portion of the robot body 2. The mobile carriage 4 is a portion corresponding to a foot portion of the lower body of the person. The mobile carriage 4 is connected to a lower portion of the lifter 3.

The humanoid robot 1 configured in this way can be suitably used as a service robot that provides a predetermined service to visitors to an event venue. As a matter of course, the humanoid robot 1 can be used for other purposes in addition to the service robot. Instead of the lifter 3 and the mobile carriage 4, two leg portions (limb portions) may be connected to a lower portion of the robot body 2 to form a bipedal walking robot.

As shown in FIG. 3, the robot body 2 includes a body portion 10, two arm portions 11 (limb portions) connected to upper right and left portions of the body portion 10, and one head portion 12 connected to an upper portion of the body portion 10. In the present embodiment, a traveling direction of the humanoid robot 1 will be referred to as an X-axis positive direction, a left-hand direction when viewed from the humanoid robot 1 will be referred to as a Y-axis positive direction, and an antigravity direction in the humanoid robot 1 will be referred to as a Z-axis positive direction. In addition, an X-axis will be referred to as a roll axis, a Y-axis will be referred to as a pitch axis, and a Z-axis will be referred to as a yaw axis.

The body portion 10 includes a neck portion 13 to which the head portion 12 is connected and a waist portion 14 to which the lifter 3 is connected. For example, the head portion 12 is connected to the neck portion 13 to be swingable around the yaw axis (Z-axis) and the pitch axis (Y-axis). A camera 12a for imaging an external object is mounted on the head portion 12. A base plate 15 corresponding to a human pelvis is provided in a lower portion of the waist portion 14. The lifter 3 is connected to a lower surface of the base plate 15.

The two arm portions 11 include an upper arm portion 21 close to a shoulder and a lower arm portion 22 close to a hand, which are connected to each other to be bendable in an elbow as a boundary. A hand portion 24 is connected to a tip of the lower arm portion 22 via a wrist portion 23. The wrist portion 23 connects the lower arm portion 22 and the hand portion 24 to each other to be swingable around the roll axis (X-axis), for example.

The robot body 2 has a body that imitates a human skeleton structure. In brief, a skeleton structure of an upper body (hereinafter, simply referred to as an "upper body skeleton structure") of the robot body 2 is formed by a spine portion 16 extending in a Z-axis direction, various bone portions 17 formed of sheet metal, a hipbone portion 18 connected to the spine portion 16 to support the spine portion 16.

The neck portion 13 of the humanoid robot 1 is connected to the spine portion 16, and furthermore, the head portion 12 is disposed thereon. Drive units 19 that control driving of the upper body are disposed on both right and left sides across the spine portion 16. The bone portion 17 includes a rib portion 17a, a breast bone portion 17b, and a clavicle portion 17c. The rib portion 17a is connected to the spine portion 16, and supports a rear surface side of the right and left drive units 19. The breast bone portion 17b connects the right and left drive units 19 on a front surface side. The clavicle portion 17c is connected to the spine portion 16 and the neck portion 13 above the drive units 19, and is connected to right and left shoulder portions.

A predetermined space (also referred to as an internal ventilation flow path 100 which will be described later) is formed inside the upper body skeleton structure of the humanoid robot 1 by the bone portion 17 and the spine portion 16. The right and left drive units 19 are disposed to be respectively accommodated in the predetermined space. The drive units 19 are supported by the respective bone portions 17. In this manner, the two drive units 19 are attached inside the body portion 10.

Here, in the body portion 10, an inner shell of the humanoid robot 1 refers to an inner frame (inner surface) of the bone portion 17 and the spine portion 16 which surround the space in which the drive units 19 are accommodated. In addition, in the body portion 10, an outer shell of the humanoid robot 1 refers to an outer frame (outer surface) of the bone portion 17 and the spine portion 16 which face a side opposite to the space. In the body portion 10 of the present embodiment, the frames are exposed, and a space on the inner shell side and a space on the outer shell side of the humanoid robot 1 communicate with each other via a gap between the frames.

On the other hand, a surface of the arm portion 11 is covered with a skin portion 11a formed of plastic. In the arm portion 11, the inner shell of the humanoid robot 1 refers to an inner side (inner surface) of the skin portion 11a. In addition, in the arm portion 11, the outer shell of the humanoid robot 1 refers to an outer side (outer surface) of the skin portion 11a. The arm portion 11 may not have the skin portion 11a as in the body portion 10. In this case, the inner side of the frame which supports a motor (not shown) may be referred to as the inner shell of the humanoid robot 1, and the outer side of the frame may be referred to as the outer shell of the humanoid robot 1.

The drive unit 19 connects the arm portion 11 to the body portion 10 to be swingable around the roll axis (X-axis), for example. However, a robot internal structure for an operation thereof is not a core of the present invention. Accordingly, detailed description thereof will be omitted herein. For example, details of the drive units 19 may refer to Japanese Patent No. 6104876 which is a known document. In addition, a link mechanism including a shoulder joint, a neck joint, and wrist/ankle joints of the humanoid robot 1 is not the core of the present invention. Accordingly, detailed description thereof will be omitted herein.

Incidentally, for example, the shoulder joint may adopt configurations disclosed in Japanese Patent No. 5763359 and Japanese Patent No. 5877686 which are known documents. In addition, for example, the neck joint may adopt a configuration disclosed in Japanese Patent No. 5872846 which is a known document. In addition, for example, the wrist/ankle joints may adopt a configuration disclosed in Japanese Patent No. 5722747 which is a known document. In addition, for example, the whole body of the humanoid robot 1 may adopt a configuration disclosed in Japanese Unexamined Patent Application, First Publication No. 2017-82803 which is a known document.

Referring back to FIG. 1, the heat discharge garment 5 covers portions of the robot body 2 excluding the head portion 12 and the hand portion 24. For example, according to a JIS L 1096A method (Frazier method), a ventilation amount of a fabric forming the heat discharge garment 5 is preferably 10 cm$^3$/cm$^2$s or smaller, and is more preferably 6 cm$^3$/cm$^2$s or smaller. When the ventilation amount is available in this way, the heat discharge garment 5 has excellent waterproof and windproof properties.

A texture forming the fabric of the heat discharge garment 5 is not particularly limited, and for example, includes a plain weave, a twill weave, a satin weave, a change plain weave, a change twill weave, a change satin weave, a change weave, a pattern weave, a single weave, a double weave, a multiple weave, a warp pile weave, a weft pile weave, and a leno weave. Mass (total weight) per unit area of the fabric is preferably in a range of 40 to 200 g/m$^2$, and is more preferably in a range of 60 to 180 g/m$^2$. In addition, resin-laminated or coated textures formed of polyurethane are also effectively used as the fabrics.

In addition, the texture forming the fabric of the heat discharge garment 5 is not particularly limited, and for example, it is possible to use polyester fibers of polyethylene terephthalate, polytrimethylene terephthalate, and polybutylene terephthalate, polyurethane fibers, polyamide fibers, acetate fibers, cotton fibers. Rayon fibers, ethylene vinyl alcohol fibers, or nylon fibers.

The heat discharge garment 5 is configured so that a base body includes a front body 30 (refer to FIG. 1), rear bodies 31a and 31b (refer to FIG. 2), a collar 32, and sleeves 33a and 33b. The rear bodies 31a and 31b cover a rear surface side of the humanoid robot 1, and are closed to be openable and closable by a line fastener 34. The line fastener 34 extends from a lower portion of the rear bodies 31a and 31 in the antigravity direction, and reaches the collar 32. The ventilation amount of the line fastener 34 in a closed state is preferably equal to or smaller than the ventilation amount of the fabric of the heat discharge garment 5.

The rear bodies 31a and 31b have opening portions 31a1 and 31b1 in which the two right and left air blowers 6 are disposed. The air blower 6 of the present embodiment is provided on the humanoid robot 1 side, and is fixed to the rib portion 17a described above. A suction port of the air blower 6 is exposed outward of the heat discharge garment 5 from the opening portions 31a1 and 31b1. The air blower 6 has a configuration in which external air is suctioned via the suction port and is blown into the upper body skeleton structure of the humanoid robot 1 described above. The air blower 6 may be provided on the heat discharge garment 5 side, and in this case, the air blower 6 may be sewn on the rear bodies 31a and 31b.

Reinforcing portions 31a2 and 31b2 having strength increased by folding the fabric are formed on opening peripheral edge portions of the opening portions 31a1 and 31b1. The reinforcing portions 31a2 and 31b2 are in close contact with a periphery of the air blower 6 by utilizing elasticity of the fabric of the heat discharge garment 5. In this manner, airtightness of a gap between the heat discharge garment 5 and the air blower 6 is ensured. The opening peripheral edge portions (reinforcing portions 31a2 and 31b2) of the opening portions 31a1 and 31b1 may be pinched between a main body of the air blower 6 and a suction port cover so that the opening portions 31a1 and 31b1 are fixed while the airtightness is ensured.

The air blower 6 is not particularly limited. As long as a total pressure of the air blower in a case of standard air is lower than approximately 30 kPa (JIS B 0132: 2005 air blower/compressor terms), for example, a fan (referred to as an air blower having the pressure lower than 10 kPa) or an air blower (referred to as an air blower having the pressure of 10 kPa or higher and lower than 30 kPa) may be used. A type thereof may be a displacement type or a turbo type. The air blower 6 of the present embodiment is a fan having the pressure lower than 10 kPa, and more specifically, a fan motor in which a fan and a motor are integrated is used. The fan motor is a turbo type axial fan. As the air blower 6, for example, a turbo type centrifugal fan may be used.

The heat discharge garment 5 includes a tightening portion 40 which brings an interior of the heat discharge garment 5 to which the external air is blown by the air blower 6 into a positive pressure state, and forms an air blowing flow path 101 (refer to FIG. 3) between the heat discharge garment 5 and the outer shell of the humanoid robot 1. As shown in FIG. 1, the tightening portion 40 is formed in respective opening portions 35 of the heat discharge garment 5 through which the neck portion 13, the waist portion 14, and the arm portion 11 of the humanoid robot 1 pass. In addition, in each of the opening portions 35, a receiving member 50 that comes into contact with the tightening portion 40 provided in the heat discharge garment 5 is provided on the robot body 2 side.

The receiving member 50 is a substantially columnar block body. The receiving member 50 includes an outer peripheral surface 51 that comes into contact with the tightening portion 40, and an annular protrusion portion 52 that protrudes outward in a radial direction from the outer peripheral surface 51. The annular protrusion portions 52 are provided in both end portions of the receiving member 50 in an axial direction in which a central axis of the receiving member 50 extends. The receiving member 50 has an axial length and an outer diameter which correspond to each opening portion 35 of the heat discharge garment 5. The receiving member 50 may be formed of a resin material having a weight relatively lighter than that of a metal material.

Out of the opening portions 35 of the heat discharge garment 5, as shown in FIG. 1, a cuff opening portion 35b through which the arm portion 11 passes is provided with a tightening portion 40b having a hook-and-loop fastener 41. A slit 35b1 extending toward the shoulder side of the humanoid robot 1 is formed in the cuff opening portion 35b. The hook-and-loop fastener 41 connects the fabrics on both sides of the slit 35b1 while stacking (tightening) the fabrics on both sides of the slit 35b1. The outer peripheral surface 51 of the receiving member 50 is in contact with a portion tightened by the hook-and-loop fastener 41 over an entire periphery. In this manner, airtightness of a gap between the receiving member 50 (arm portion 11) and the tightening portion 40b (heat discharge garment 5) is ensured.

In addition, out of the opening portions 35 of the heat discharge garment 5, the tightening portion 40a provided in the collar opening portion 35a through which the neck portion 13 passes is in close contact with the receiving member 50 by utilizing the elasticity of the fabric when the collar 32 is closed by a line fastener 34, as shown in FIG. 2. In this manner, the airtightness of the gap between the receiving member 50 (neck portion 13) and the tightening portion 40a (heat discharge garment 5) is ensured. The hook-and-loop fastener 41 may be provided in the tightening portion 40a, as in the tightening portion 40b described above.

Next, referring to FIG. 4, out of the opening portions 35 of the heat discharge garment 5, a configuration of a tightening portion 40c provided in a bottom opening portion 35c through which the waist portion 14 passes will be described.

Figure 4:
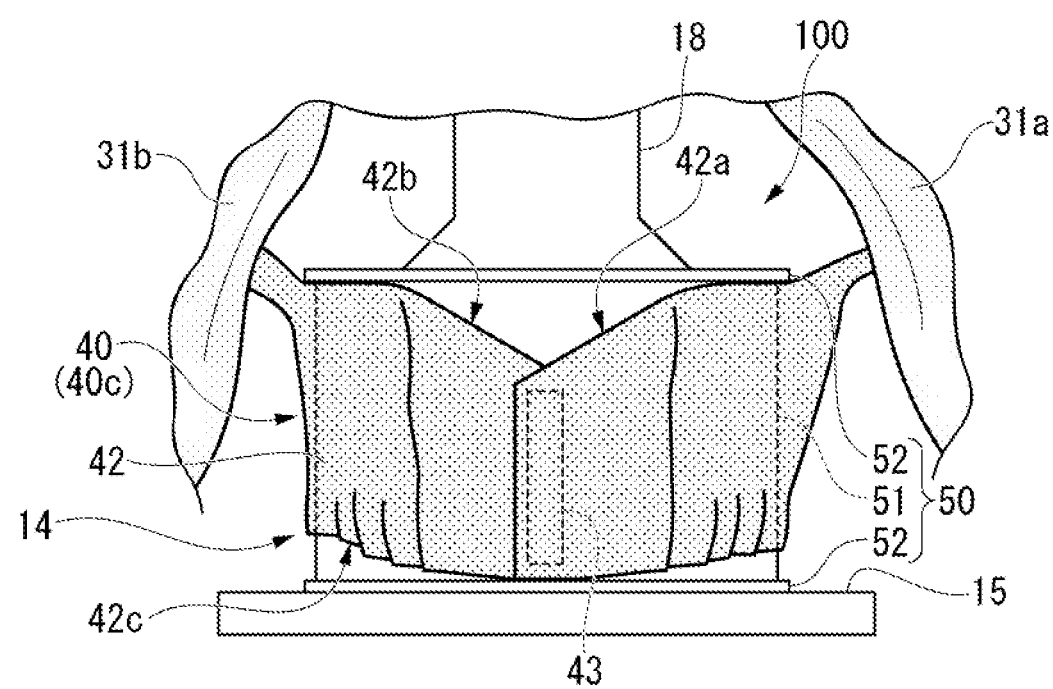
FIG. 4 is a rear view showing a configuration of a tightening portion in a bottom opening portion of the heat discharge garment according to the first embodiment.

FIG. 4 is a rear view showing the configuration of the tightening portion 40c in the bottom opening portion 35c of the heat discharge garment 5 according to the first embodiment of the present invention. In FIG. 4, the waist portion 14 of the humanoid robot 1 is viewed from a rear surface side in a state where the rear bodies 31a and 31b are open.

As shown in FIG. 4, the tightening portion 40c has an inner fabric 42 fixed to the entire periphery of the inner side of the rear bodies 31a and 31b (and the front body 30). The inner fabric 42 may be formed of a fabric same as that of the heat discharge garment 5.

The inner fabric 42 is formed in a band shape turning around the waist portion 14 (receiving member 50). An upper end side of the inner fabric 42 other than both end portions 42a and 42b is fixed to an inner side of the heat discharge garment 5 by a sewing thread. Both end portions 42a and 42b of the inner fabric 42 are provided with a hook-and-loop fastener 43 for connecting the both of these to each other, and all can be connected in an annular shape.

Stretchable flat rubber is woven or sewn on a lower end side of the inner fabric 42, thereby forming an elastic stretchable portion 42c that can come into close contact with the outer peripheral surface 51 of the receiving member 50. In this manner, the airtightness of the gap between the receiving member 50 (waist portion 14) and the tightening portion 40c (heat discharge garment 5) is ensured.

In addition, referring back to FIG. 1, the cuff opening portion 35b is provided with an air discharge port 36 that communicates with the air blowing flow path 101 (refer to FIG. 3) inside the heat discharge garment 5. The air discharge port 36 is formed in the tightening portion 40b by the slit 35b1 extending to the shoulder side from the hook-and-loop fastener 41 (receiving member 50). That is, the air fetched from the air blower 6 on the rear surface side of the humanoid robot 1 shown in FIG. 2 flows from the internal ventilation flow path 100 passing through the inner shell (inner side of the upper body skeleton structure) of the humanoid robot 1 shown in FIG. 3 through the air blowing flow path 101 passing between the heat discharge garment 5 and the outer shell of the humanoid robot 1. The air is discharged outward from the air discharge port 36 of the cuff opening portion 35b shown in FIG. 1 (in FIGS. 1 and 2, the air flowing into and flowing out from the heat discharge garment 5 is indicated by a thick line arrow).

In this way, in the present embodiment, the humanoid robot 1 wears the heat discharge garment 5, and the external air is blown into the heat discharge garment 5 by the air blower 6. Heat-generating portions (driving unit and control device) of a whole body of the humanoid robot 1 is cooled by the air. Thereafter, the heated air is discharged from the cuff opening portion 35b in an end of the humanoid robot 1. Here, as shown in FIG. 3, the air blowing flow path 101 is provided between the heat discharge garment 5 and the outer shell of the humanoid robot 1. Accordingly, for example, even in a case of the arm portion 11 which frequently has complicated postures, a flow path through which the air passes can be secured between the skin portion 11a and the sleeves 33a and 33b, and the air can be prevented from being blocked.

Therefore, according to the above-described embodiment, the heat discharge garment 5 covering the humanoid robot 1 and the air blower 6 provided in the humanoid robot 1 or the heat discharge garment 5 to blow the external air into the humanoid robot 1 or the heat discharge garment 5 are provided. The air blowing flow path 101 is provided between the heat discharge garment 5 and the outer shell of the humanoid robot 1. Accordingly, the whole body of the humanoid robot 1 can be effectively cooled. In addition, the lightweight and airtight fabric such as the heat discharge garment 5 is used. In this manner, for example, it is not necessary to form the skin portion on the body portion 10 as shown in FIG. 3. Therefore, it is possible to reduce a weight and costs of the humanoid robot 1. In addition, the skin portion 11a may be eliminated from the arm portion 11. In this manner, it possible to further reduce the weight and the costs.

In addition, in the present embodiment, the heat discharge garment 5 includes the tightening portion 40 which forms the air blowing flow path 101 while bringing the interior of the heat discharge garment 5 into a positive pressure state. According to this configuration, the interior of the heat discharge garment 5 can be brought into the positive pressure state by reducing the amount of the air flowing out from the respective opening portions 35 of the heat discharge garment 5, through the neck portion 13, the waist portion 14, and the arm portion 11 of the humanoid robot 1 pass. When the interior of the heat discharge garment 5 is in the positive pressure state, the heat discharge garment 5 swells. The heat discharge garment 5 floats from the outer shell of the humanoid robot 1 in portions other than the tightening portion 40. In this case, even when the arm portion 11 is bent, a gap between the outer shell of the humanoid robot 1 and the heat discharge garment 5 is secured without being affected by a bent posture of the arm portion 11. As a result, the whole body of the humanoid robot 1 can be effectively cooled.

In addition, in the present embodiment, the humanoid robot 1 includes the receiving member 50 that comes into contact with the tightening portion 40 provided in the heat discharge garment 5. According to this configuration, the tightening portion 40 can come into contact with the outer peripheral surface 51 of the flat receiving member 50. Therefore, a gap is less likely to be formed between both of these. Therefore, the airtightness can be easily ensured, compared to a case where the tightening portion 40 comes into contact with an exposed frame of the humanoid robot 1. In the present embodiment, an example has been described in which the receiving member 50 is the columnar body. However, as long as any solid body has a flat (smooth) surface, the receiving member 50 may be a polygonal prism, a sphere, or an ellipsoid.

In addition, in the present embodiment, the heat discharge garment 5 has the cuff opening portion 35b serving as the opening portion 35 through which the arm portion 11 of the humanoid robot 1 passes, and the cuff opening portion 35b is provided with air discharge port 36 communicating with the air blowing flow path 101. According to this configuration, after the whole body of the humanoid robot 1 is air-cooled, the heated air can be discharged from the cuff opening portion 35b in the end of the humanoid robot 1. Therefore, the air can be blown to every place in the whole body of the humanoid robot.

In addition, in the present embodiment, the heat discharge garment 5 has the bottom opening portion 35c serving as the opening portion 35 through which the waist portion 14 of the humanoid robot 1 passes, and the tightening portion 40c is provided inside the bottom opening portion 35c. According to this configuration, the tightening portions 40c are dually provided inside the bottom opening portion 35c. In this manner, it is possible to prevent an air leakage without impairing a design (design property) of the heat discharge garment 5. In this manner, an external appearance of the humanoid robot 1 suitable for the service robot can be achieved.

In addition, in the present embodiment, the internal ventilation flow path 100 communicating with the air blowing flow path 101 is formed in the inner shell of the humanoid robot 1. According to this configuration, the air fetched by the air blower 6 flows once inside the robot body 2 (inside ribs in a case of a human), and is blown from there to the above-described air blowing flow path 101. Therefore, the heat can be efficiently discharged. Therefore, an air-cooling operation peculiar to the humanoid robot 1 which cannot be realized by the human can be achieved.

Second Embodiment

Next, a second embodiment of the present invention will be described. In the following description, the same reference numerals will be assigned to configurations the same as or equivalent to those in the above-described embodiment, and description thereof will be simplified or omitted.

Figure 5:
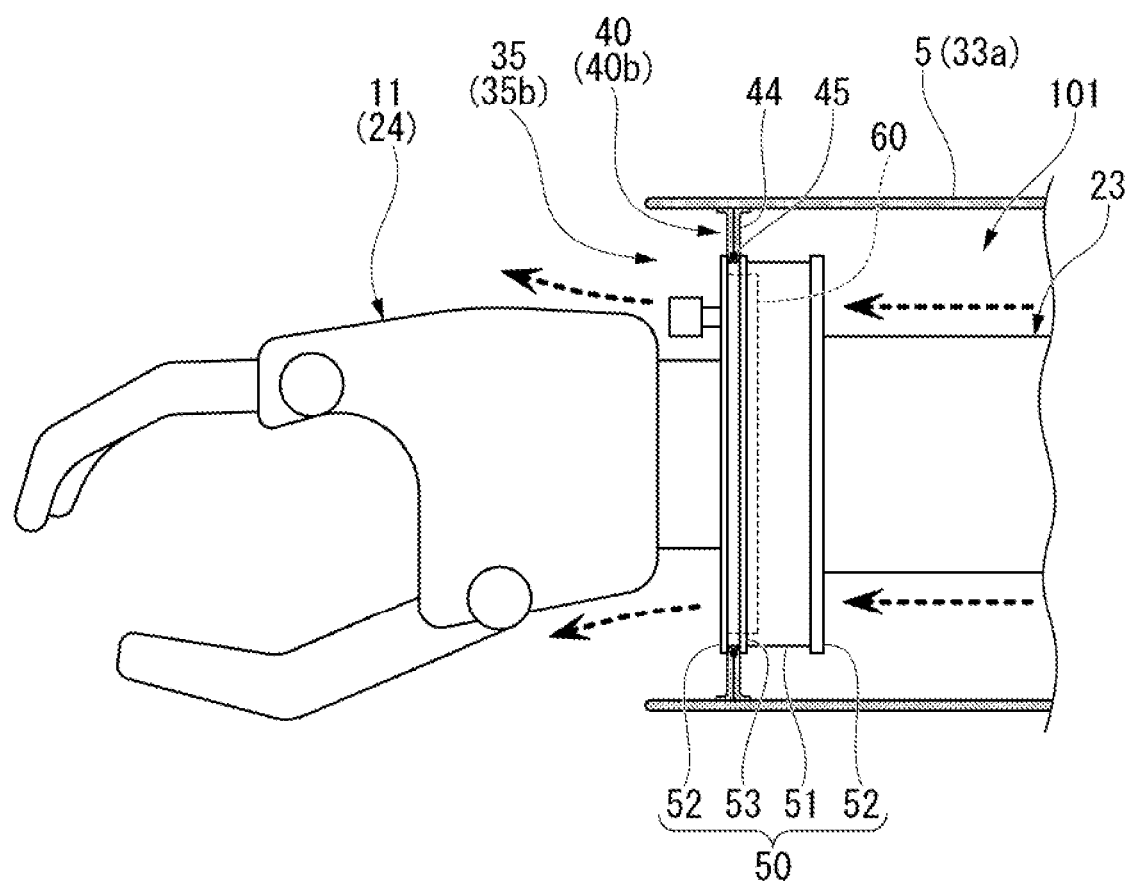
FIG. 5 is a configuration diagram showing a configuration of a tightening portion and a receiving member in a cuff opening portion of a heat discharge garment according to a second embodiment of the present invention.

FIG. 5 is a configuration diagram of the tightening portion 40b and the receiving member 50 in the cuff opening portion 35b of the heat discharge garment 5 according to the second embodiment of the present invention.

As shown in FIG. 5, the tightening portion 40b of the second embodiment has an inner fabric 44 fixed to the entire periphery of the inner side of the sleeve 33a (same applies to the sleeve 33b) of the heat discharge garment 5. The inner fabric 44 may be formed of the fabric the same as that of the heat discharge garment 5.

The inner fabric 44 is formed in an annular shape around the wrist portion 23 (receiving member 50), and a radially outer side thereof is fixed to the inner side of the heat discharge garment 5 by a sewing thread. In addition, a stretchable rubber band 45 is woven or sewn inside the inner fabric 44 in the radial direction, and is in close contact with the outer peripheral surface 51 of the receiving member 50. In the receiving member 50 of the second embodiment, a second annular protrusion portion 53 is formed between the pair of annular protrusion portions 52 (first annular protrusion portions), thereby forming a groove having a width suitable for the tightening portion 40b. In this manner, the airtightness of the gap is ensured between the receiving member 50 (wrist portion 23) and the tightening portion 40b (heat discharge garment 5).

Figure 6:
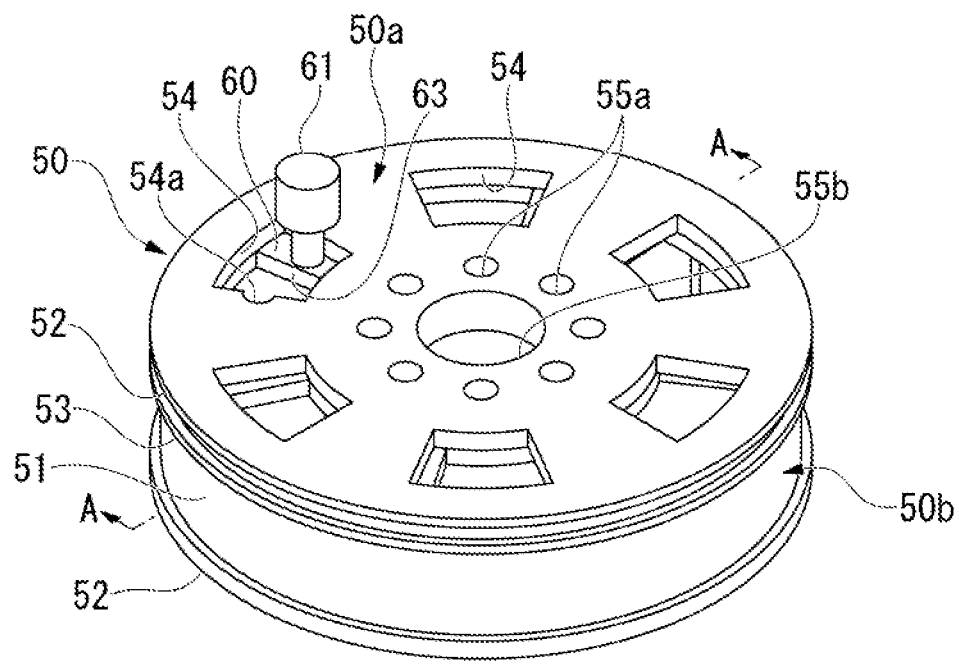
FIG. 6 is a perspective view of the receiving member according to the second embodiment of the present invention.
Figure 7:
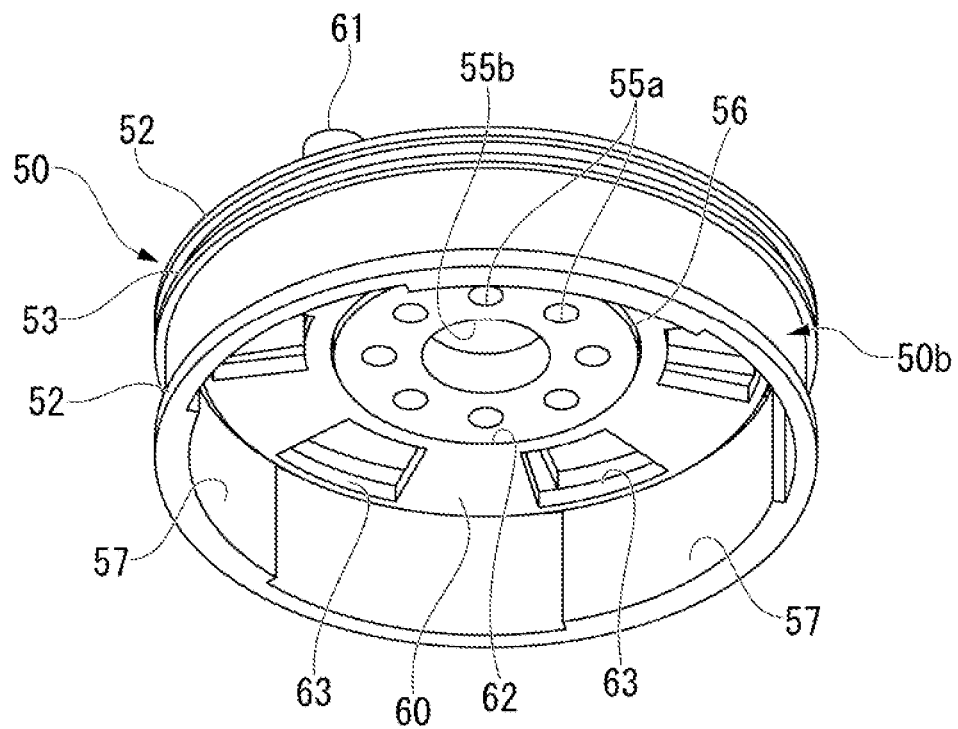
FIG. 7 is a perspective view when the receiving member shown in FIG. 6 is viewed from another direction.
Figure 8:
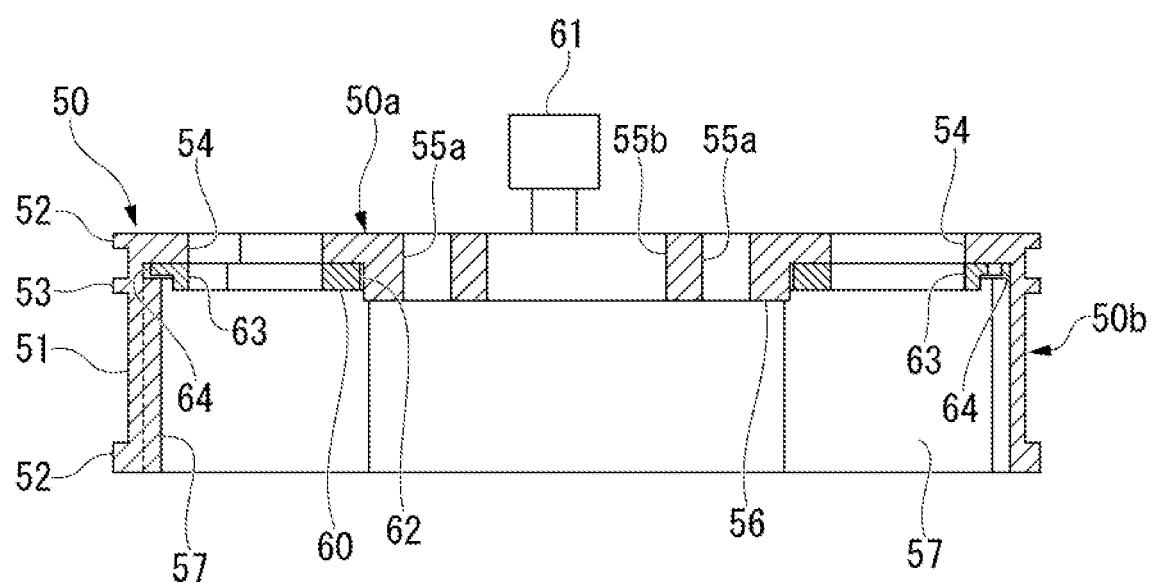
FIG. 8 is a sectional view taken along line A-A of the receiving member shown in FIG. 6.

FIG. 6 is a perspective view of the receiving member 50 according to the second embodiment of the present invention. FIG. 7 is a perspective view when the receiving member 50 shown in FIG. 6 is viewed in another direction. FIG. 8 is a sectional view taken along line A-A of the receiving member 50 shown in FIG. 6.

As shown in FIG. 6, the receiving member 50 of the second embodiment has a ventilation port 54 through which the air passes. A plurality of the ventilation ports 54 are formed to penetrate a top wall portion 50a of the receiving member 50 formed in a topped cylindrical shape in the axial direction in which the central axis of the receiving member 50 extends.

The plurality of ventilation ports 54 are formed in a substantially fan shape, and the plurality of ventilation ports 54 are formed at an interval in a circumferential direction around the central axis of the top wall portion 50a having a disc shape. One of the plurality of ventilation ports 54 has a recess 54a in which an operation piece 61 (to be described later) is accommodated. A plurality of fixing holes 55a for being fixed to the wrist portion 23 are formed at an interval in the circumferential direction inside in the radial direction of the top wall portion 50a from the ventilation port 54. In addition, inside in the radial direction of the top wall portion 50a from the fixing hole 55a, one through-hole 55b for passing a wire or a link member (not shown) connecting the wrist portion 23 and the hand portion 24 to each other is provided in a central portion.

As shown in FIG. 7, a plurality of engagement protrusion portions 57 protruding inward in the radial direction are formed at an interval in the circumferential direction, inside a peripheral wall portion 50b of the receiving member 50 suspended from a peripheral edge portion of the top wall portion 50a. As shown in FIG. 8, the engagement protrusion portion 57 extends linearly from an opening end of the peripheral wall portion 50b to a front side of the rear side of the top wall portion 50a. In addition, an annular boss portion 56 projecting in a vertical direction of the peripheral wall portion 50b is formed on the rear side of the top wall portion 50a. The fixing hole 55a and the through-hole 55b which are described above are formed in the annular boss portion 56.

That is, the annular boss portion 56 is disposed inside in the radial direction from the ventilation port 54 described above.

Inside the receiving member 50 formed in this way, a flow rate adjustment member 60 for adjusting a size of an opening area of the ventilation port 54 engages with the receiving member 50 to be rotatable around the central axis of the receiving member 50. As shown in FIG. 7, the flow rate adjustment member 60 is a disk member in which an insertion hole 62 through which the annular boss portion 56 passes is formed in the central portion, and includes a plurality of ventilation port 63 formed outside in the radial direction from the insertion hole 62. The ventilation port 63 (second ventilation port) of the flow rate adjustment member 60 is formed to have the number, a shape, and disposition the same as those of the ventilation port 54 (first ventilation port) of the receiving member 50.

As shown in FIG. 8, an engagement piece 64 protruding outward in the radial direction is formed on an outer peripheral surface of the flow rate adjustment member 60. The engagement piece 64 is inserted into a gap (undercut portion) between the top wall portion 50a of the receiving member 50 and the engagement protrusion portion 57. A plurality of the engagement pieces 64 are formed to have a size insertable into each gap between the engagement protrusion portions 57 adjacent to each other in the circumferential direction shown in FIG. 7.

As shown in FIG. 6, the operation piece 61 that can be operated from a front side of the top wall portion 50a of the receiving member 50 is attached to the flow rate adjustment member 60. The operation piece 61 is disposed by being inserted into the ventilation port 54 in which a groove 54a is formed. When the operation piece 61 comes into contact with an opening edge of the ventilation port 54, a rotation angle of the flow rate adjustment member 60 with respect to the receiving member 50 in the circumferential direction is limited to a certain range. In this range, at least a portion of the engagement piece 64 engages with the engagement protrusion portion 57 of the receiving member 50 in the axial direction. In this manner, the flow rate adjustment member 60 is prevented from falling out of the receiving member 50. It is preferable to provide a thread in a shaft portion of the operation piece 61 to be attachable to and detachable from the flow rate adjustment member 60. In this manner, limitation on the rotation angle of the flow rate adjustment member 60 can be easily released, and the flow rate adjustment member 60 can be easily disassembled from the receiving member 50.

According to the second embodiment of the above-described configuration, the operation piece 61 is operated to increase or decrease an overlapping area between the ventilation port 54 of the receiving member 50 and the ventilation port 63 of the flow rate adjustment member 60. Accordingly, a flow rate of the air passing through the receiving member 50 can be adjusted. In this manner, it is possible to control the positive pressure state inside the heat discharge garment 5. For example, when intake capacity (air volume) of the air blower 6 is low, the opening area of the ventilation port 54 is reduced to raise an air pressure inside the heat discharge garment 5. Accordingly, the whole body of the humanoid robot 1 can be effectively cooled by the air. In addition, when the intake capacity (air volume) of the air blower 6 is high, the opening area of the ventilation port 54 is enlarged. In this manner, air ventilation inside the heat discharge garment 5 can be promoted.

In addition, in the second embodiment, as shown in FIG. 5, the tightening portion 40b is provided inside the cuff opening portion 35b. According to this configuration, the tightening portions 40b are dually provided inside the cuff opening portion 35b. In this manner, it is possible to prevent an air leakage without impairing the design (design property) of the heat discharge garment 5. In this manner, an external appearance of the humanoid robot 1 suitable for the service robot can be achieved.

Figure 9:
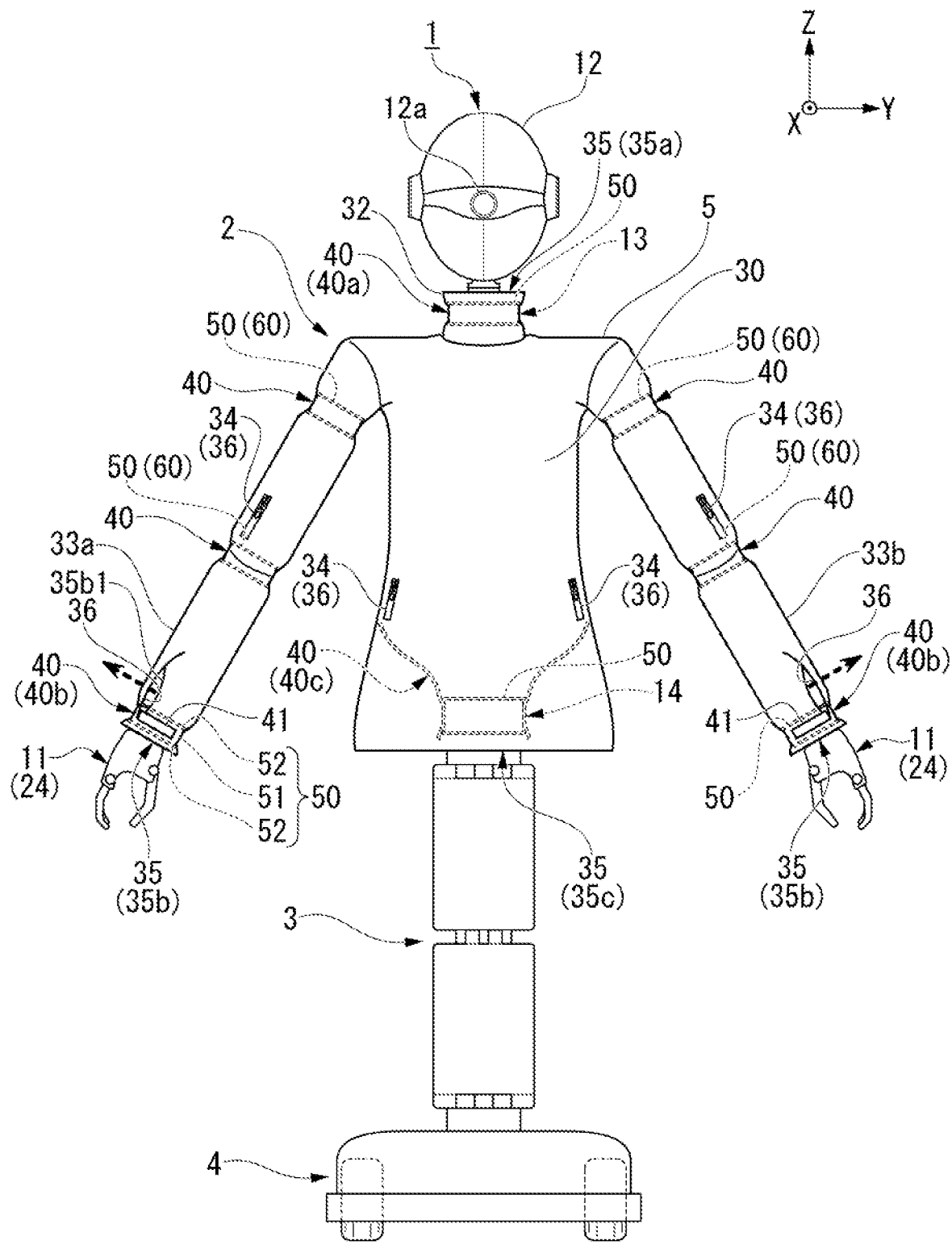
FIG. 9 is a front view of a humanoid robot which shows an application example of the receiving member and a flow rate adjustment member according to the second embodiment of the present invention.

The receiving member 50 and the flow rate adjustment member 60 of the second embodiment described above may be provided in the humanoid robot 1 in a form shown in FIG. 9.

FIG. 9 is a front view of the humanoid robot 1 showing an application example of the receiving member 50 and the flow rate adjustment member 60 in the second embodiment of the present invention.

The humanoid robot 1 shown in FIG. 9 includes the receiving member 50 and the flow rate adjustment member 60 of the second embodiment described above in the vicinity of an elbow and a shoulder of the arm portion 11. In addition, the line fastener 34 (air discharge port 36) that can discharge the air from a space partitioned by the receiving member 50 and the flow rate adjustment member 60 is provided in the sleeves 33a and 33b and the front body 30 (or the rear bodies 31a and 31b) of the heat discharge garment 5.

According to the configuration shown in FIG. 9, each of the flow rate adjustment members 60 is operated so that the air intensively flows to a portion where heat generation is particularly observed inside the heat discharge garment 5. In this manner, air-cooling can be promoted. For example, when the heat generation is particularly observed in the drive unit 19 (refer to FIG. 3) of the body portion 10, the line fastener 34 of the front body 30 is opened, and the flow rate adjustment member 60 near the shoulder is operated to reduce an opening area of the ventilation port 54 of the receiving member 50. In this manner, the air can intensively flow to the body portion 10. In addition, when the heat generation is particularly observed in the drive unit (not shown) of the upper arm portion 21 (refer to FIG. 3), the line fasteners 34 of the sleeves 33a and 33b are opened, and the flow rate adjustment member 60 near the elbow is operated to reduce the opening area of the ventilation port 54 of the receiving member 50. In this manner, the air can intensively flow to the upper arm portion 21. The receiving member 50 and the flow rate adjustment member 60 of the second embodiment may be further provided at a plurality of locations corresponding to the heat-generating portions of the whole body of the humanoid robot 1.

Third Embodiment

Next, a third embodiment of the present invention will be described. In the following description, the same reference numerals will be assigned to configurations the same as or equivalent to those in the above-described embodiment, and description thereof will be simplified or omitted.

Figure 10:
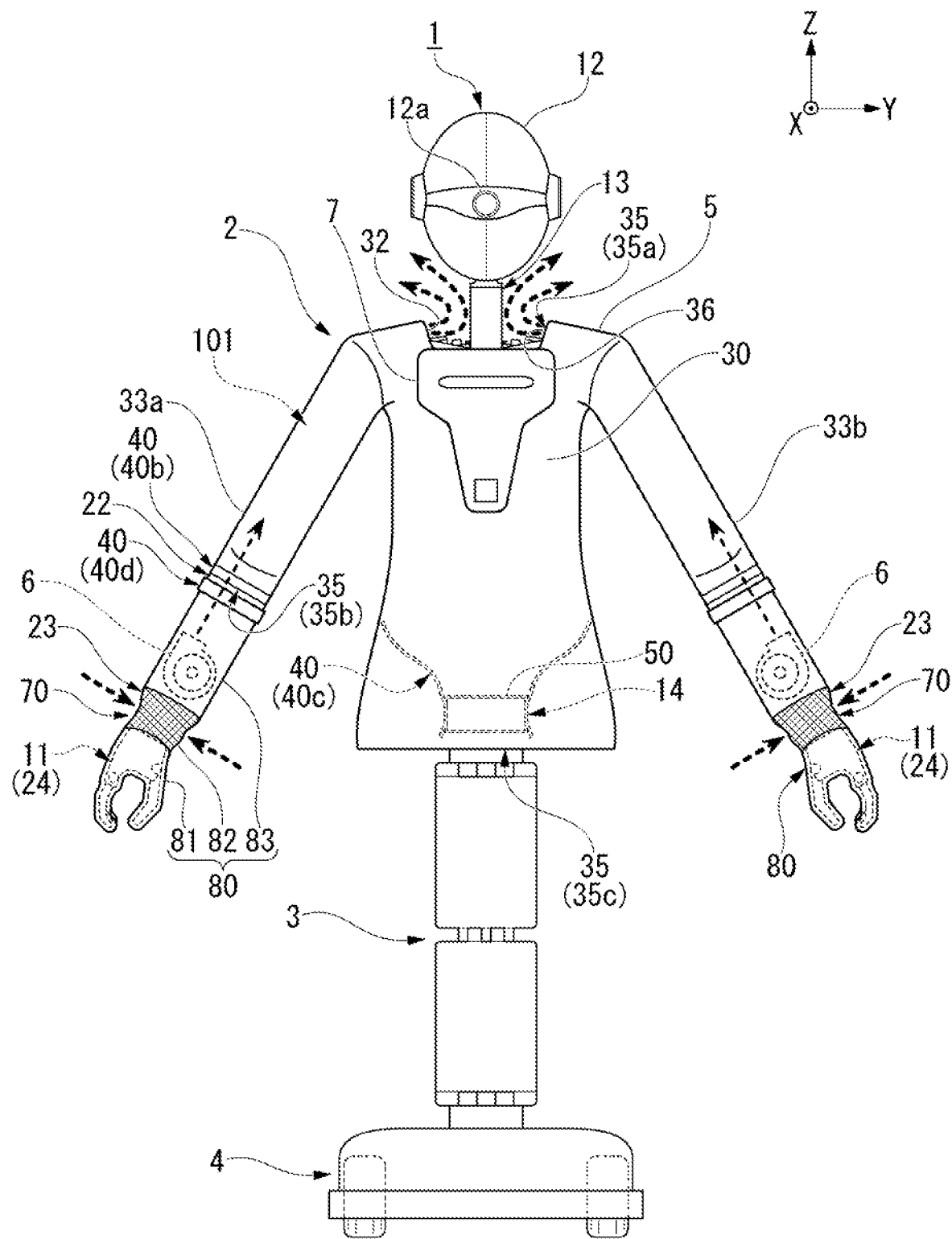
FIG. 10 is a front view of a humanoid robot wearing a heat discharge garment according to a third embodiment of the present invention.
Figure 11:
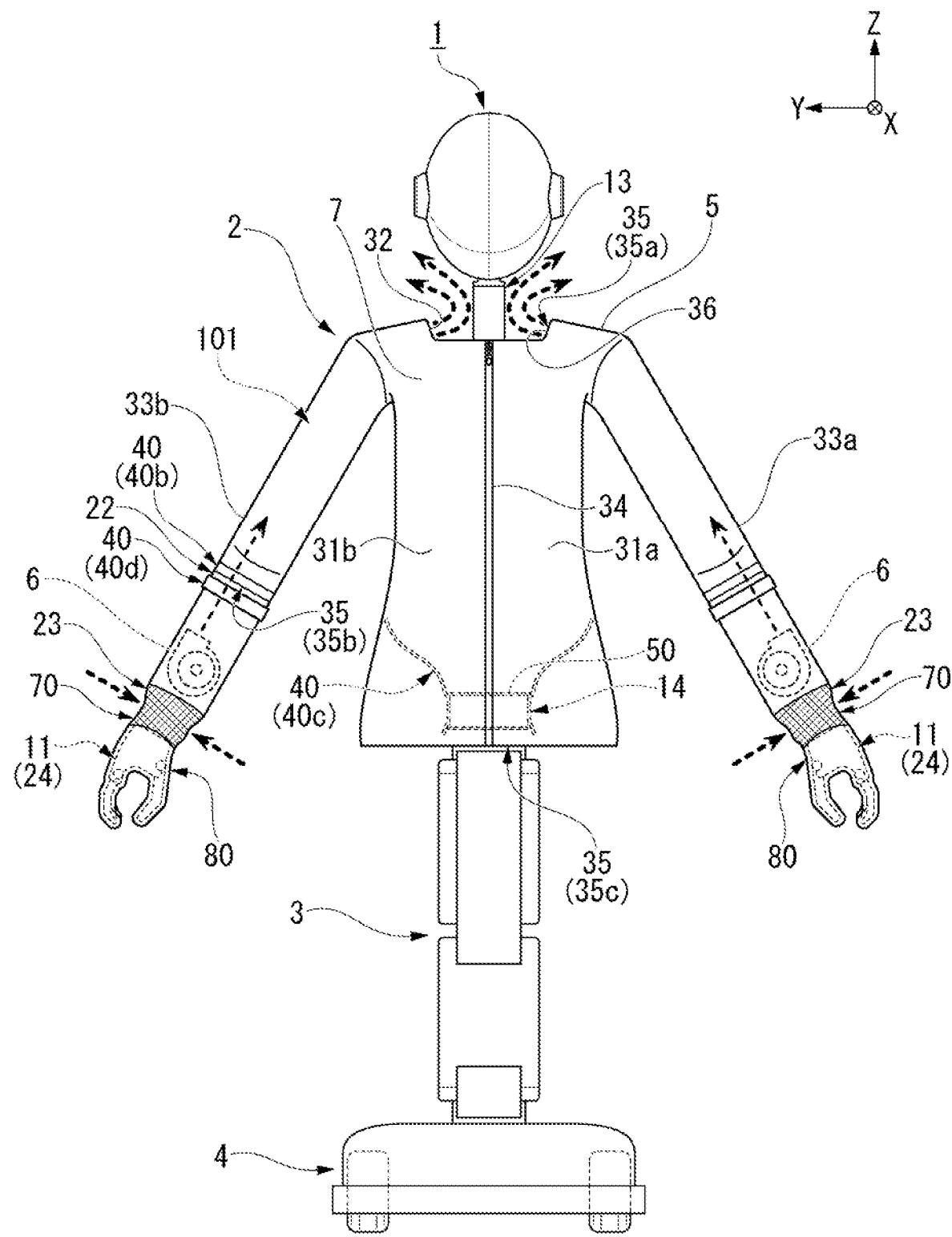
FIG. 11 is a rear view of the humanoid robot shown in FIG. 10.
Figure 12:
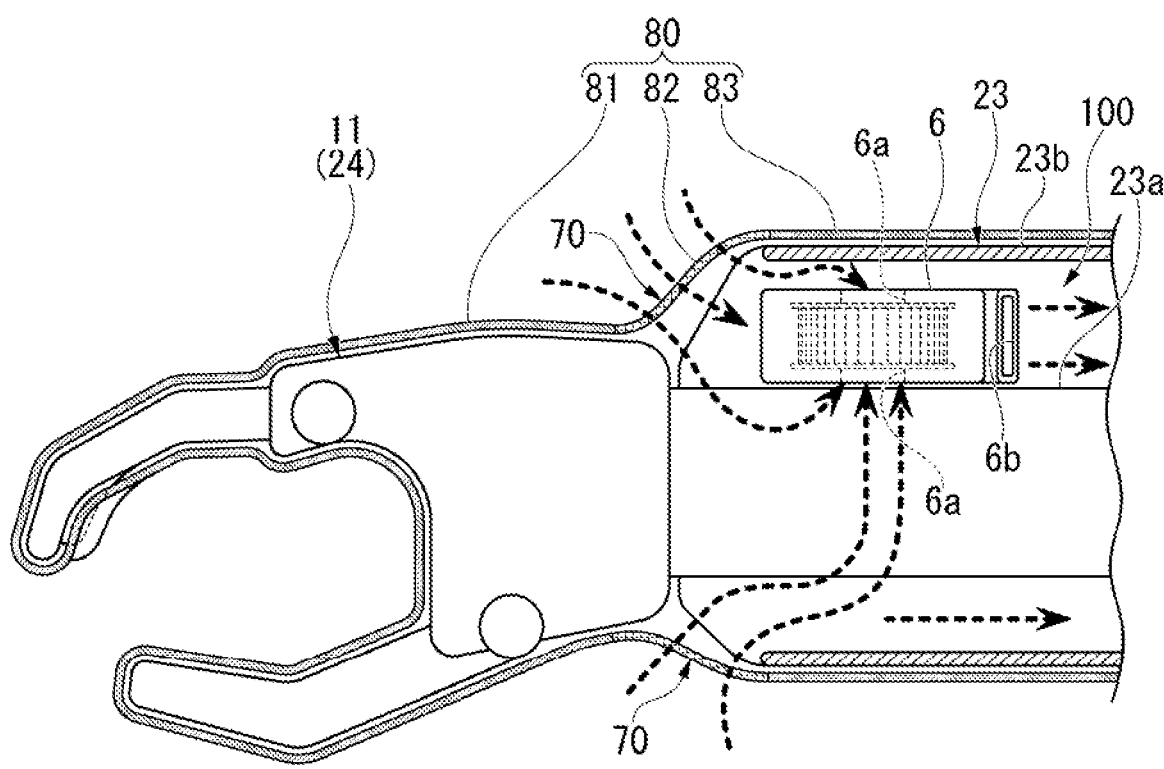
FIG. 12 is a sectional view of a wrist portion of the humanoid robot according to the third embodiment of the present invention.

FIG. 10 is a front view of the humanoid robot 1 wearing the heat discharge garment 5 according to the third embodiment of the present invention. FIG. 11 is a rear view of the humanoid robot 1 shown in FIG. 10. FIG. 12 is a sectional view of the wrist portion 23 of the humanoid robot 1 according to the third embodiment of the present invention.

As shown in FIG. 10, in the third embodiment, an air intake port 70 for fetching the external air into the air blowing flow path 101 from the wrist portion 23 of the humanoid robot 1 is provided.

In the heat discharge garment 5 of the third embodiment, the air discharge port 36 communicating with the air blowing flow path 101 is provided in the collar opening portion 35a through which the neck portion 13 of the humanoid robot 1 passes. That is, the collar opening portion 35a does not have the above-described tightening portion 40a, and the neck portion 13 does not have the above-described receiving member 50. In this way, in the third embodiment, the tightening portion 40 is provided inside at least one of the opening portions 35 (cuff opening portion 35b and bottom opening portion 35c) excluding the collar opening portion 35a.

In addition, as shown in FIG. 11, the air blower 6 is not provided on a rear surface of the humanoid robot 1, and the air blower 6 is provided in the wrist portion 23 of the humanoid robot 1. In this way, the third embodiment is configured so that the air is suctioned from the wrist portion 23 of the humanoid robot 1 and the air is discharged from the neck portion 13 of the humanoid robot 1. An apron plate 7 is attached to the humanoid robot 1 of the third embodiment to externally display a logo that is covered by the heat discharge garment 5.

As shown in FIG. 10, the heat discharge garment 5 of the third embodiment has three-quarter sleeves in which the sleeves 33a and 33b extend to the lower arm portion 22. A portion from the lower arm portion 22 to the wrist portion 23 and the hand portion 24 is covered with a heat discharge glove 80. The air intake port 70 is formed in the heat discharge glove 80. The cuff opening portion 35b is provided with the tightening portion 40b, and the tightening portion 40b is in contact with the outer shell of the lower arm portion 22 over the entire periphery.

The heat discharge glove 80 has a glove portion 81, a wrist cover portion 82, and an arm cover portion 83. The glove portion 81 covers the hand portion 24. For example, when the humanoid robot 1 grips an object to carry out work, the glove portion 81 may employ a material having good elasticity in a movable portion, or a non-slip silicon material for a fingertip. The above-described air blowing flow path 101 is not basically formed in the glove portion 81. Accordingly, the glove portion 81 may not have air permeability of the heat discharge garment 5.

The wrist cover portion 82 covers the wrist portion 23. The wrist cover portion 82 is formed of a mesh-like fabric having excellent air permeability, and a mesh thereof forms the air intake port 70. As shown in FIG. 12, the wrist portion 23 has a wrist body 23a and a tubular or U-shaped wrist cover 23b that surrounds the wrist body 23a. The wrist cover portion 82 of the heat discharge glove 80 covers at least a gap between the hand portion 24 and the wrist cover 23b.

The above-described internal ventilation flow path 100 is formed inside the wrist cover 23b. The air blower 6 is provided in the internal ventilation flow path 100 in the wrist portion 23. As the air blower 6, it is preferable to use a blower fan having a suction port 6a on upper and lower surfaces in the axial direction and having a discharge port 6b on a side surface in the radial direction. The blower fan has a higher air pressure and higher directivity than those of an axial fan. Accordingly, it is possible to efficiently cool the arm portion 11 whose flow path is relatively narrower than that of the body portion 10.

Referring back to FIG. 10, the arm cover portion 83 covers the lower an portion 22. The arm cover portion 83 has a tightening portion 40d in an arm passing port through which the lower arm portion 22 passes. The tightening portion 40d is formed of the above-described hook-and-loop fastener, and is in contact with the outer shell of the lower arm portion 22 over the entire periphery. The arm cover portion 83 may be formed of a fabric the same as that of the heat discharge garment 5 in order to prevent a leakage of the air fetched from the air intake port 70.

According to the third embodiment of the above-described configuration, when the air blower 6 is driven, the external air is fetched into the interior from the wrist portion 23 (air intake port 70 of the heat discharge glove 80) of the humanoid robot 1. As shown in FIG. 12, the fetched air is suctioned into the air blower 6 provided in the internal ventilation flow path 100 of the wrist portion 23, and is discharged toward the lower arm portion 22 (specifically, the internal ventilation flow path 100 of the lower arm portion 22). The air passing through the internal ventilation flow path 100 of the lower arm portion 22 flows into the air blowing flow path 101 described above, cools the upper arm portion 21 to the shoulder portion and then, the body portion 10 of the humanoid robot 1, and is discharged from the collar opening portion 35a (air discharge port 36) of the heat discharge garment 5, through which the neck portion 13 passes.

In this way, in the third embodiment described above, the air intake port 70 for fetching in the external air from the wrist portion 23 of the humanoid robot 1 into the air blowing flow path 101 is provided. Accordingly, it is possible to intensively cool the arm portion 11 having many movable portions and vigorously generating the heat. In addition, the air is discharged on the body portion 10 side instead of the arm portion 11. Accordingly, the air is not discharged to an object gripped by the hand portion 24. Therefore, for example, even when the humanoid robot 1 carries out work in a restaurant, the humanoid robot 1 can be hygienically used.

In addition, in the third embodiment, the air blower 6 is provided in the wrist portion 23 of the humanoid robot 1. Accordingly, it is possible to efficiently cool the arm portion 11 whose flow path is relatively narrower than that of the body portion 10. In addition, as the air blower 6, it is preferable to use a blower fan having a higher air pressure and higher directivity than those of an axial fan.

In addition, in the third embodiment, the heat discharge garment 5 has the collar opening portion 35a serving as the opening portion 35 through which the neck portion 13 of the humanoid robot 1 passes, and the collar opening portion 35a is provided with the air discharge port 36 communicating with the air blowing flow path 101. Accordingly, a chimney effect can be obtained, and the air lightened by obtaining the heat by cooling the arm portion 11 and the body portion 10 can be efficiently discharged from the neck portion 13. Although the chimney effect cannot be obtained, a configuration may be adopted in which the air discharge port 36 may be provided in the bottom opening portion 35c so that the air is discharged from the lower portion of the body portion 10.

Hitherto, preferred embodiments of the present invention have been described with reference to the drawings. However, the present invention is not limited to the above-described embodiments. The various shapes and combinations of the respective configuration members represented in the above-described embodiment are merely examples, and can be changed in various ways, based on design requirements within the scope not departing from the concept of the present invention.

For example, in the above-described embodiment, the tightening portion 40c is provided inside the bottom opening portion 35c of the heat discharge garment 5 (first embodiment), and the tightening portion 40b is provided inside the cuff opening portion 35b of the heat discharge garment 5 (second embodiment). However, for example, the tightening portion 40a may be similarly provided inside the collar opening portion 35a of the heat discharge garment 5.

In addition, for example, in the above-described embodiment, a form in which the lower body of the humanoid robot 1 is configured to include the lifter 3 and the mobile carriage 4 has been described as an example. However, a form in which the lower body of the humanoid robot 1 has two leg portions (limb portions) may be adopted. In this case, the heat discharge garment 5 may be an overall (connector) type in which an upper garment and a lower garment are integrated with each other. In this case, the air discharge port 36 may be formed in the bottom opening portion through which the two leg portions pass.

In addition, for example, in the second embodiment described above, a form in which the flow rate adjustment member 60 is a sliding type has been described as an example. However, the type is not particularly limited as long as the size of the opening area of the ventilation port 54 of the receiving member 50 can be adjusted.

In addition, for example, in the second embodiment described above, a form in which the inner fabric 44 of the tightening portion 40b shown in FIG. 5 is formed of the fabric the same as that of the heat discharge garment 5 has been described as an example. However, for example, the inner fabric 44 may be formed of a mesh-like fabric having excellent air permeability so that t a predetermined amount of the air can pass therethrough from the periphery of the receiving member 50.

In addition, for example, in the third embodiment described above, the air discharge port 36 is provided in the collar opening portion 35a. However, the air discharge port 36 may be provided in another place such as a place under an armpit of the heat discharge garment 5. In addition, an assistant air blower for assisting the air discharge may be provided in the vicinity of the air discharge port 36 (for example, the shoulder portion of the humanoid robot 1 in the vicinity of the collar opening portion 35a).

In addition, for example, in the third embodiment described above, the following form has been described as an example. The sleeves 33a and 33b of the heat discharge garment 5 are three-quarter sleeves extending to the lower arm portion 22. The lower arm portion 22, the wrist portion 23, and the hand portion 24 are covered with the heat discharge glove 80. However, the lower end of the sleeves 33a and 33b of the heat discharge garment 5 may be fixed to the vicinity of the lower end of the lower arm portion 22 by the tightening portion 40 such as the hook-and-loop fastener. The upper end of the arm cover portion 83 of the heat discharge glove 80 may be fixed to the vicinity of the upper end of the wrist portion 23 by the tightening portion 40 such as the hook-and-loop fastener. That is, a joint between the lower arm portion 22 and the wrist portion 23 may not be covered with the heat discharge glove 80 or the heat discharge garment 5. Even in this case, the internal ventilation flow path 100 of the wrist portion 23 communicates with the air blowing flow path 101 on the body portion 10 side via the internal ventilation flow path 100 of the lower an portion 22.

According to this configuration, even when the wrist portion 23 rotates with respect to the lower arm portion 22 larger than the wrist of the human, it is possible to eliminate a possibility that the heat discharge glove 80 or the heat discharge garment 5 may be twisted in a joint portion between the lower arm portion 22 and the wrist portion 23, or a possibility that the air blowing flow path 101 may be blocked due to the twist. In addition, the humanoid robot 1 can easily wear the heat discharge garment 5 and the heat discharge glove 80.

INDUSTRIAL APPLICABILITY

According to the humanoid robot described above, the whole body of the humanoid robot can be effectively cooled.

REFERENCE SIGNS LIST

1: Humanoid robot
5: Heat discharge garment
6: Air blower
10: Body portion
11: Arm portion (Limb portion)
13: Neck portion
14: Waist portion
35: Opening portion
35*a*: Collar opening portion
35*b*: Cuff opening portion
35*b*1: Slit
35*c*: Bottom opening portion
36: Air discharge port
40: Tightening portion
40*a*: Tightening portion
40*b*: Tightening portion
40*c*: Tightening portion
50: Receiving member
54: Ventilation port
60: Flow rate adjustment member
61: Operation piece
63: Ventilation port
64: Engagement piece
100: Internal ventilation flow path
101: Air blowing flow path

What is claimed is:

1. A humanoid robot comprising:
a heat discharge garment that covers the humanoid robot; and
an air blower provided in the humanoid robot or the heat discharge garment to blow external air into the humanoid robot or the heat discharge garment,
wherein an air blowing flow path is provided between the heat discharge garment and an outer shell of the humanoid robot;
wherein the heat discharge garment includes a tightening portion that forms the air blowing flow path while bringing an interior of the heat discharge garment into a positive pressure state, and
wherein the humanoid robot includes a receiving member that comes into contact with the tightening portion provided in the heat discharge garment.

2. The humanoid robot according to claim 1,
wherein a ventilation port through which air passes is formed in the receiving member, and
the humanoid robot includes a flow rate adjustment member that adjusts an opening area of the ventilation port of the receiving member.

3. The humanoid robot according to claim 2,
wherein the heat discharge garment has opening portions through which a neck portion, a waist portion, and a limb portion of the humanoid robot pass, and
the tightening portion is provided inside at least one of the opening portions.

4. The humanoid robot according to claim 1,
wherein the heat discharge garment has opening portions through which a neck portion, a waist portion, and a limb portion of the humanoid robot pass, and
the tightening portion is provided inside at least one of the opening portions.

5. The humanoid robot according to claim 1,
wherein an internal ventilation flow path communicating with the air blowing flow path is formed in an inner shell of the humanoid robot.

6. A humanoid robot comprising:
a heat discharge garment that covers the humanoid robot;
an air blower provided in the humanoid robot or the heat discharge garment to blow external air into the humanoid robot or the heat discharge garment,
wherein an air blowing flow path is provided between the heat discharge garment and an outer shell of the humanoid robot,
wherein the heat discharge garment has a cuff opening portion or a bottom opening portion formed as an opening portion through which a limb portion of the humanoid robot passes, and
an air discharge port communicating with the air blowing flow path is provided in the cuff opening portion or the bottom opening portion.

7. A humanoid robot comprising:
a heat discharge garment that covers the humanoid robot;
an air blower provided in the humanoid robot or the heat discharge garment to blow external air into the humanoid robot or the heat discharge garment,
wherein an air blowing flow path is provided between the heat discharge garment and an outer shell of the humanoid robot,
wherein an air intake port for fetching external air into the air blowing flow path from a wrist portion of the humanoid robot is provided.

8. The humanoid robot according to claim 7,
wherein the air blower is provided in the wrist portion of the humanoid robot.

9. The humanoid robot according to claim 8,
wherein a collar opening portion is formed in the heat discharge garment, as an opening portion through which a neck portion of the humanoid robot passes, and
an air discharge port communicating with the air blowing flow path is provided in the collar opening portion.

10. The humanoid robot according to claim 7,
wherein a collar opening portion is formed in the heat discharge garment, as an opening portion through which a neck portion of the humanoid robot passes, and
an air discharge port communicating with the air blowing flow path is provided in the collar opening portion.

* * * * *